United States Patent
Liu et al.

(10) Patent No.: US 10,826,817 B2
(45) Date of Patent: Nov. 3, 2020

(54) ROUTING TABLE SYNCHRONIZATION METHOD, APPARATUS, AND SYSTEM

(71) Applicant: ALIBABA GROUP HOLDING LIMITED, George Town, Grand Cayman (KY)

(72) Inventors: Junfeng Liu, Hangzhou (CN); Wenhui Yao, Hangzhou (CN); Jiaji Zhu, Hangzhou (CN)

(73) Assignee: ALIBABA GROUP HOLDING LIMITED, George Town, Grand Cayman (KY)

( * ) Notice: Subject to any disclaimer, the term of this patent is extended or adjusted under 35 U.S.C. 154(b) by 53 days.

(21) Appl. No.: 16/125,471

(22) Filed: Sep. 7, 2018

(65) Prior Publication Data

US 2018/0367441 A1 Dec. 20, 2018

Related U.S. Application Data

(63) Continuation of application No. PCT/CN2017/074630, filed on Feb. 23, 2017.

(30) Foreign Application Priority Data

Mar. 9, 2016 (CN) .......................... 2016 1 0133755

(51) Int. Cl.
*H04L 12/751* (2013.01)
*H04L 29/08* (2006.01)
(Continued)

(52) U.S. Cl.
CPC ............ *H04L 45/02* (2013.01); *G06F 16/182* (2019.01); *G06F 16/27* (2019.01);
(Continued)

(58) Field of Classification Search
CPC ..... H04L 45/02; H04L 69/18; H04L 67/1097; H04L 67/1095; H04L 45/54; G06F 16/182; G06F 16/27
(Continued)

(56) References Cited

U.S. PATENT DOCUMENTS

| 2003/0225861 | A1 | 12/2003 | Iwamura et al. |
| 2013/0124912 | A1 | 5/2013 | Griffith et al. |
| 2016/0112516 | A1* | 4/2016 | Liu ................. H04L 67/1097 709/223 |

FOREIGN PATENT DOCUMENTS

| CN | 1731400 A | 2/2006 |
| CN | 100442282 C * | 12/2008 ............. G06F 17/30 |

(Continued)

OTHER PUBLICATIONS

English translation (CN 100442282-C), Dec. 10, 2008, Hangzhou Huawei 3COM Tech (Year: 2008).*

(Continued)

*Primary Examiner* — Tu T Nguyen
(74) *Attorney, Agent, or Firm* — Finnegan, Henderson, Farabow, Garrett & Dunner, LLP

(57) ABSTRACT

The present disclosure provides routing table synchronization methods, apparatuses, and systems. One exemplary method comprises: acquiring modified routing table data if it is detected that a routing table in a default first data management group is modified; and synchronizing the modified routing table data to at least one non-default second data management groups to update a routing table in the at least one non-default second data management group. The first data management group and the at least one second data management group are deployed in a distributed file system. The technical solutions provided in present disclosure can address the technical problem that when any routing table in a distributed file system is modified, routing (Continued)

tables in the system may not be synchronized because routing tables in the distributed file system are static tables.

20 Claims, 12 Drawing Sheets

(51) Int. Cl.
*G06F 16/27* (2019.01)
*G06F 16/182* (2019.01)
*H04L 29/06* (2006.01)

(52) U.S. Cl.
CPC ...... *H04L 67/1095* (2013.01); *H04L 67/1097* (2013.01); *H04L 69/18* (2013.01)

(58) Field of Classification Search
USPC ........................................................ 709/217
See application file for complete search history.

(56) References Cited

FOREIGN PATENT DOCUMENTS

| | | |
|---|---|---|
| CN | 103139081 A | 8/2013 |
| CN | 103259824 A | 8/2013 |
| CN | 104050249 A | 9/2014 |
| CN | 104253748 A | 12/2014 |
| CN | 104283906 A | 1/2015 |
| CN | 104348734 A | 2/2015 |
| CN | 104468364 A | 3/2015 |
| WO | WO 2017/152768 A1 | 9/2017 |

OTHER PUBLICATIONS

First Search Report issued by the State Intellectual Property Office of the People's Republic of China in related Chinese Application No. 2016101337558; dated Sep. 23, 2019 (2 pgs.).

First Chinese Office Action issued by the State Intellectual Property Office of People's Republic of China in related Chinese Application No. 2016101337558.8, dated Oct. 8, 2019 (11 pgs.).

Written Opinion and International Search Report of the International Searching Authority issued in related International Application No. PCT/CN2014/074636; dated May 17, 2017 (8 pgs.).

\* cited by examiner

400

1100

ROUTING TABLE SYNCHRONIZATION METHOD, APPARATUS, AND SYSTEM

This application claims priority to International Application No. PCT/CN2017/074630, filed on Feb. 23, 2017, which claims priority to and the benefits of priority to Chinese Application No. 201610133755.8, filed on Mar. 9, 2016, both of which are incorporated herein by reference in their entireties.

TECHNICAL FIELD

The present disclosure relates to the field of data synchronization, and in particular, to routing table synchronization methods, apparatuses, and systems.

BACKGROUND

Data plays a crucial role in computer and Internet applications. With the arrival of an era of explosively increasing information, there are higher and higher requirements for large data storage capacity and read/write speed. Conventional methods seek to expand data storage capacity of a computer file system by increasing the number of hard disks. Such methods cannot meet users' requirements in terms of storage capacity, capacity growth rates, data read/write speed, and data security. Nowadays, data storage and management are generally performed by using a distributed file system.

In Internet applications, a routing table can be stored in an address resolution server of a distributed file system, and data can be cached by using a scheduling module. The routing table can be a table stored in a router or another Internet device. It can store specific paths to certain network terminals. Based on the paths stored in the routing table, the router can search the paths and determine an optimal transmission path for each data packet passing through the router. Routing tables stored in distributed file systems are generally static routing tables, which cannot be modified if an actual transmission path changes. Therefore, when an actual transmission path changes, data packets cannot be transmitted normally.

Because in existing techniques, the routing tables in distributed file systems are static tables, when a table in a data management group is modified, tables in the remaining data management groups cannot be modified synchronously. This may cause problems in data transmission. Therefore, there is need for efficient solutions to the above problems.

SUMMARY

In light of the above, embodiments of the present disclosure provide routing table synchronization methods, apparatuses, and systems. One objective of the present disclosure is to address the technical problem that when a table in one data management group is modified, tables in the remaining data management groups cannot be modified synchronously.

According to some embodiments of the present disclosure, routing table synchronization methods are provided. One exemplary method comprises: acquiring modified routing table data if it is detected that a routing table in a default first data management group is modified; and synchronizing the modified routing table data to at least one non-default second data management groups to update a routing table in the at least one non-default second data management group, wherein the first data management group and the at least one second data management group are deployed in a distributed file system.

According to some embodiments of the present disclosure, routing table synchronization apparatuses are provided. One exemplary apparatus comprises: a first acquisition module configured to acquire modified routing table data if it is detected that a routing table in a default first data management group is modified; and a synchronization module configured to synchronize the modified routing table data to at least one non-default second data management groups to update a routing table in the at least one non-default second data management group, wherein the first data management group and at least one second data management group are deployed in a distributed file system.

According to some embodiments of the present disclosure, routing table synchronization systems are provided. One exemplary system comprises: a first data management server configured to acquire modified routing table data if it is detected that a locally stored routing table is modified, and perform synchronization based on the modified routing table data, wherein the first data management server is a server included in a default first data management group in a distributed file system; and at least one second data management server having a communication relationship with the first data management server and configured to receive data acquired through the synchronization process to update a routing table in a second data management group, the second data management server being included in a second non-default second data management group in the distributed file system.

It is appreciated that, in some embodiments, the default first data management group can be used to detect a change in a routing table in the distributed file system. That is, the default first data management group can be used to detect whether the routing table in the distributed file system is modified. The default first data management group can acquire the modified routing table data when it is detected that the routing table is modified. The second data management groups can be synchronized based on the modified routing table. In some embodiments, after the routing tables in the plurality of data management groups in the distributed file system are updated, an interface of a client terminal (a user terminal) can check to confirm a routing table in each data management group in the distributed file system is the updated routing table.

In light of the above, the solutions provided in the embodiments of the present disclosure can address the technical problems in the existing technology. In the existing technology, where when a table in any data management group is modified, tables in the remaining data management groups cannot be modified synchronously because tables in the distributed file system are static tables.

BRIEF DESCRIPTION OF THE DRAWINGS

The accompanying drawings described herein are used to further explain embodiments of the present disclosure, and they constitute a part of the present disclosure. Exemplary embodiments of the present disclosure and descriptions of the exemplary embodiments are provided for illustration purposes. They are not intended to constitute any inappropriate limitations to the scope of the present disclosure.

DETAILED DESCRIPTION

To assist with understanding the technical solutions in the present disclosure, the technical solutions in some embodiments of the present disclosure will be described in the following with reference to the accompanying drawings. It is appreciated that the embodiments described herein are only exemplary. Based on the embodiments described in the present disclosure, other embodiments or implementations can be obtained without creative efforts. All such embodiments and implementations shall all fall within the protection scope of the present disclosure.

It is appreciated that terms such as "first" and "second" used in the following description, the claims, and the accompanying drawings of the present disclosure are used to distinguish similar objects for illustration purposes. They are not intended to describe a particular mandated sequence or order. It should be appreciated that embodiments of the present disclosure described can be implemented in sequences other than those shown or described here. For example, although an order may be shown in the flowcharts in the accompanying drawings, in some embodiments, the shown or described steps can be performed in an order different from that described here. Further, steps shown in the flowcharts in the accompanying drawing can also be performed in a computer system through execution of a set of computer executable instructions.

Moreover, terms "include" and "have" and any variations of the terms are intended to cover non-exclusive inclusions. For example, a process, method, system, product, or device including a series of steps or units is not limited to those listed steps or units, but may include other steps or units that are not listed or are inherent to the process, method, product, or device.

Figure 1:
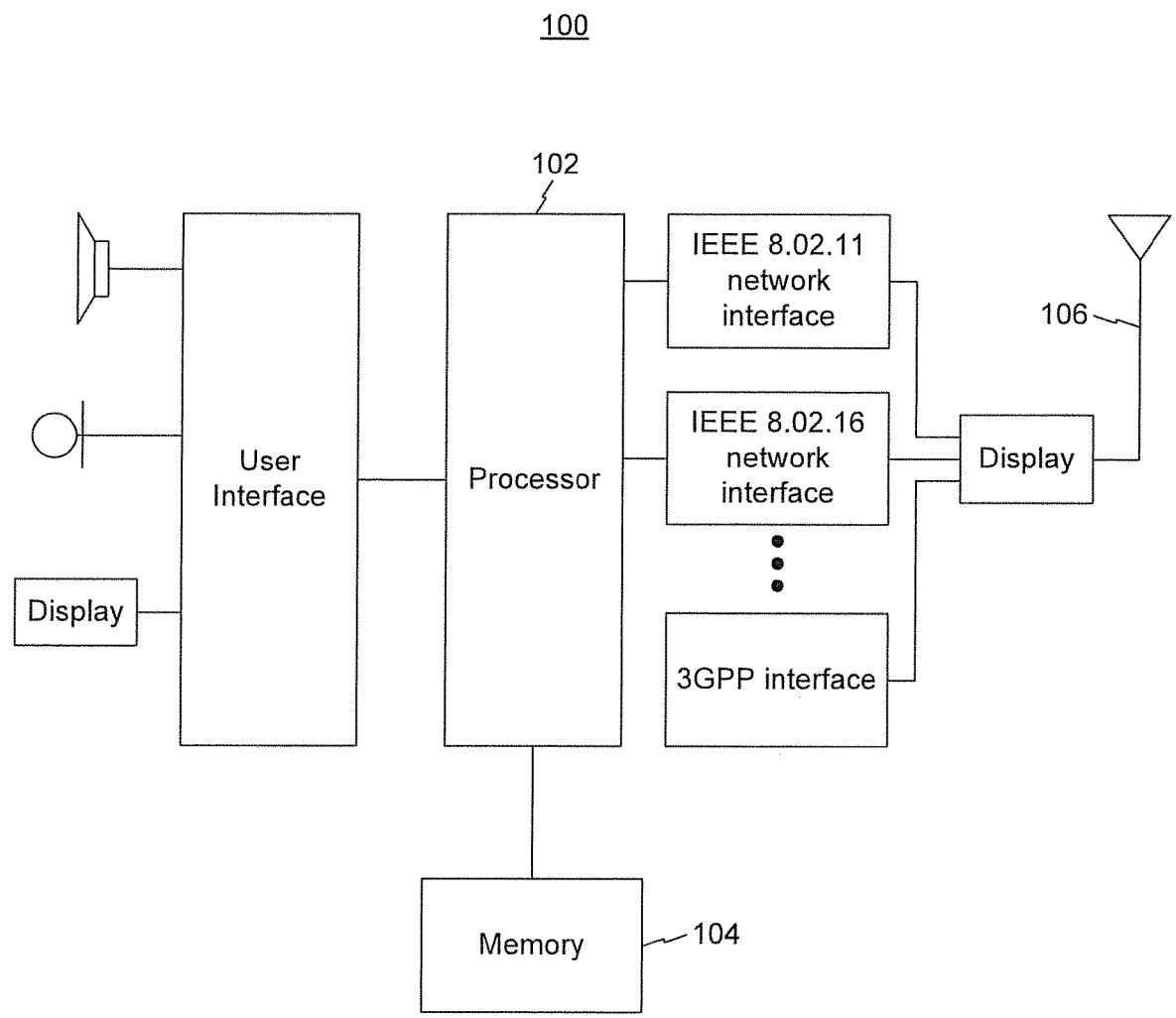
FIG. 1 is a block diagram of a hardware structure of an exemplary computer terminal used to perform an exemplary routing table synchronization method according to some embodiments of the present disclosure.

According to some embodiments of the present disclosure, routing table synchronization methods are provided. The routing table synchronization methods can be performed using a mobile terminal, a computer terminal, or a similar arithmetic device. A computer terminal is herein described as an example, as shown in FIG. 1. FIG. 1 is a block diagram of a hardware structure of a computer terminal 100 for performing a routing table synchronization method according to some embodiments of the present disclosure. As shown in FIG. 1, the exemplary computer terminal 100 may include one or more (one is shown in the figure) processors 102, a memory 104 configured to store data, and a transmission apparatus 106 having a communication function. Processor 102 may include, but is not limited to, a processing apparatus, for example, a microprocessor such as an MCU or a programmable logic device such as an FPGA. It is appreciated that the structure shown in FIG. 1 is only schematic, and is not intended to limit the structure of the above electronic apparatus. For example, computer terminal 100 may include more or fewer components than those shown in FIG. 1, or have a configuration different from that shown in FIG. 1.

Memory 104 may be configured to store software programs or modules, for example, program instructions/modules corresponding to the routing table synchronization methods or apparatuses provided in the present disclosure. Processor 102 can execute the software programs and modules stored in memory 104 to perform various functional applications and data processing associated with routing table synchronization. Memory 104 may include a high-speed random access memory, and may further include a non-volatile memory, such as one or more magnetic storage apparatuses, flash memories, or other non-volatile solid-state memories. In some embodiments, memory 104 may further include memories remotely disposed with respect to processor 102, and the remote memories may be connected to computer terminal 100 through a network. Examples of the network include, but are not limited to, the Internet, an intranet, a local area network, a mobile telecommunications network, and their combinations.

Transmission apparatus 106 can be configured to receive or send data via a network. An example of the network may include a wireless network provided by a communications provider of computer terminal 100. In some embodiments, transmission apparatus 106 can include a Network Interface Controller (NIC), which may be connected to another network device via a base station to communicate with the Internet. In some embodiments, transmission apparatus 106 may be a Radio Frequency (RF) module, which can be configured to communicate with the Internet in a wireless manner.

Figure 2:
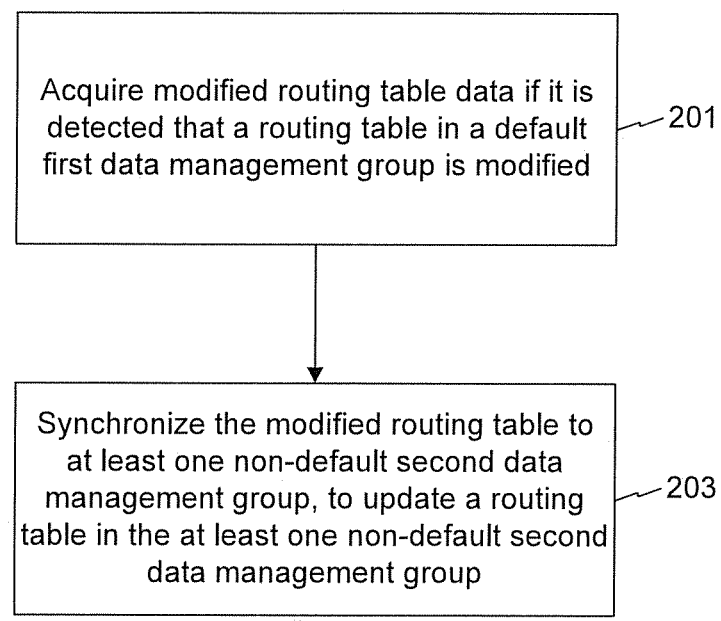
FIG. 2 is a flowchart of an exemplary routing table synchronization method according to some embodiments of the present disclosure.

In light of the above operating environment, the present disclosure further provides routing table synchronization methods. FIG. 2 is a flowchart of an exemplary routing table synchronization method 200 according to some embodiments of the present disclosure. The method shown in FIG. 2 may include the following procedures.

In step 201, modified routing table data is acquired if it is detected that a routing table in a default first data management group is modified. In some embodiments, the default first data management group can be any data management group in a distributed file system. The first data management group can be used to perform synchronization based on a received updated routing table and to update other data management groups deployed in the distributed file system.

In some embodiments, the default first data management group may be a data management group storing the most important data in the distributed file system, or a data management group storing the largest amount of data. In actual applications, which data management group in the distributed file system is used as the default first data management group is not limited by the present disclosure.

In some embodiments, the default first data management group can be used in the routing table synchronization method to detect a change in a routing table in the distributed file system. For example, the default data management group can be used to detect whether a routing table in the distributed file system is modified and to acquire the latest modified routing table when it is detected that the routing table is modified.

In some embodiments, in the distributed file system, for example, a Pangu distributed file system, a federation mode may be introduced to form data management groups. A federation stores namespaces in a distributed manner such that a system cluster can be formed, thereby achieving scalability in a distributed system. A volume can represent a title of each namespace group after the namespaces are divided into groups in the federation system.

A distributed division mode of data namespaces adopted in federation can be applied to a distributed file system, such that a group set including one or more data management servers is formed, thereby implementing a distributed storage mode. After the namespaces are divided into groups by using federation in the distributed file system, a plurality of master groups can be formed. Each group can be a data management group. Moreover, among the plurality of data management groups in the distributed file system, one of the data management groups can be a default first data management group.

It is appreciated that when the distributed file system has a master/chunk server structure, a data management server master can be configured to store meta (tag) information in the distributed file system. The meta information includes data attribute information, for example, an index of data, a title of webpage data, a keyword, and other information. A chunk server can provide a data storage service. In some routing table synchronization method embodiments, the routing table can be stored in the master of the distributed file system. The data management groups as described above correspond to a plurality of data management groups obtained after the master is divided into groups.

In step 203, based on the modified routing table data is synchronized to at least one non-default second data management groups to update a routing table in the at least one non-default second data management group. The first data management group and the at least one second data management group are deployed in the distributed file system.

As an example, the distributed file system can be Pangu system developed by Alibaba. Pangu is a distributed file system that provides data storage services for Alibaba's cloud computing platform. A Pangu master is a data management group included in the Pangu distributed file system. The Pangu master is used for recording attribute meta information of data, and a data storage group is used for storing data. After a federation mode is introduced into the Pangu distributed file storage system, a plurality of data management groups (Pangu master groups) may be obtained through division in the same server cluster. Each data management group formed by a group of data management servers corresponds to a volume. One of the data management groups is a default in the system, and also the only, primary data management group PanguDefaultVolume.

Pangu system can include a plurality of data management groups, for example, data management groups for Taobao, Taodiandian, and Laiwang. With reference to the above-described method 200, one of the plurality of data management groups in the Pangu system is PanguDefaultVolume, namely, the default first data management group as described above. The remaining data management groups in the distributed file system are second data management groups. For example, the data management group of Taobao can be used as the default first data management group, and the remaining data management groups (such as the data management groups for Taodiandian and Laiwang) in the distributed file system can be the second data management groups. When a routing table is modified, the data management group of Taobao, which is the default first data management group, first receives the latest routing table. After acquiring the latest routing table, the default first data management group synchronizes the latest routing table to the second data management groups. That is, modification of routing tables in the remaining data management groups (the second data management groups) can be accomplished by using the default first data management group.

After the routing tables in the plurality of data management groups in the distributed file system are updated, an interface of a client terminal (a user terminal) can check and confirm the routing table in each data management group in the distributed file system, to ensure that the routing table in each data management group is the latest routing table.

Figure 3:
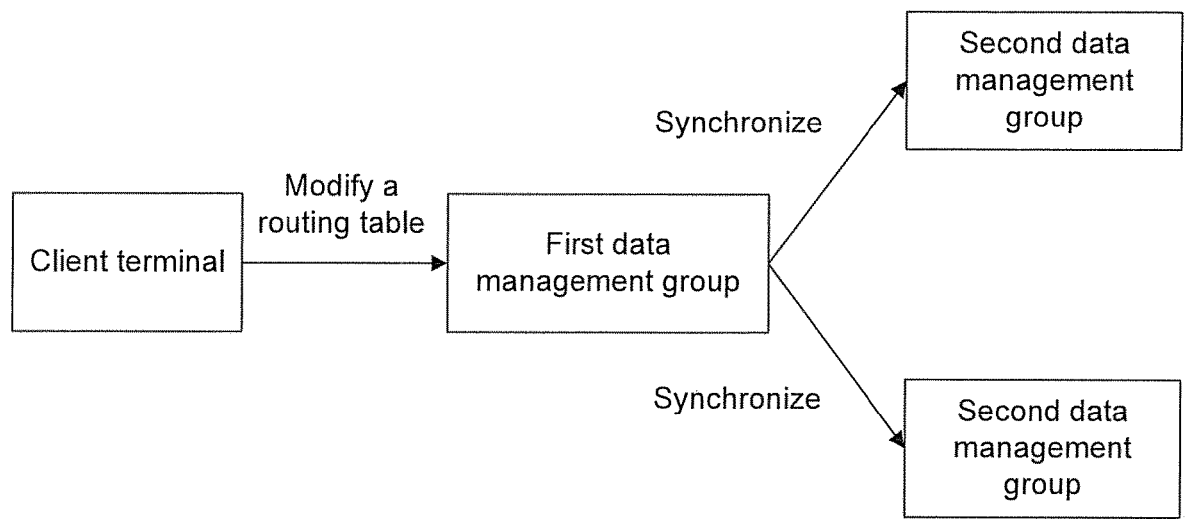
FIG. 3 is a schematic diagram of an exemplary routing table synchronization method according to some embodiments of the present disclosure.

FIG. 3 is a schematic diagram of an exemplary routing table synchronization method according to some embodiments of the present disclosure. With reference to FIG. 3, when the routing table changes due to factors such as modification by a user, the first data management group in the distributed file system first receives a new modified routing table, and then synchronizes the new routing table to the second data management groups in the distributed file system. It is appreciated that the number of the second data management groups in an actual application is not limited by the above description. That is, when the distributed file system has a plurality of second data management groups, the new routing table can be synchronized to all the second data management groups by using the first data management group.

In light of the above, the solutions of the embodiments provided in the present disclosure address the technical problem in the existing technologies where when a table in any data management group is modified, tables in the remaining data management groups cannot be modified synchronously because tables in the distributed file system are static tables.

In some embodiments, when a new second data management group is deployed in the distributed file system, a data management server in the new second data management group can be registered with the first data management group. The routing table in the first data management group can be synchronized to the new second data management group. The new second data management group is a data management group that does not exist in the original distributed file system. After the new second data management group is added, the data management server in the second data management group can be first registered with the default first data management group. That way, the latest routing table in the first data management group can be synchronized to the new second data management group. In some embodiments, the data management server can be any data management server master in the second data management group.

For example, the distributed file system can be Pangu distributed file system developed by Alibaba. A preset default first data management group can be a data management group of Taobao. If a data management group of Laiwang that does not exist in the original distributed file system is to be added to the Pangu distributed file system, a data management server of the data management group of Laiwang can be first registered with the data management group of Taobao. The data management server may be a master of the data management group of Laiwang. After the data management server of Laiwang is registered with the data management group of Taobao, communication between the data management group of Laiwang and the data management group of Taobao is enabled. That way, the data management group associated with Laiwang becomes a second data management group similar to the remaining second data management groups in the distributed file system. Routing table synchronization can be performed for the data management group of Laiwang, so that the data management group of Laiwang can include the latest routing table.

Accordingly, the above described methods provided in some embodiment of the present disclosure can address the technical problem that it is difficult to synchronize routing tables after a new data management group is added to the distributed file system.

In some embodiments, the exemplary method 200 can further include the following procedures. After receiving a routing table request initiated by a requesting terminal, any one of the data management groups in the distributed file system can acquire routing table version information in the requesting terminal from the routing table request. If the routing table version information is inconsistent with routing table version information in the data management group, the data management group returns a locally stored routing table to the requesting terminal, or the requesting terminal acquires the latest routing table by accessing a data storage server deployed in the distributed file system.

Figure 4:
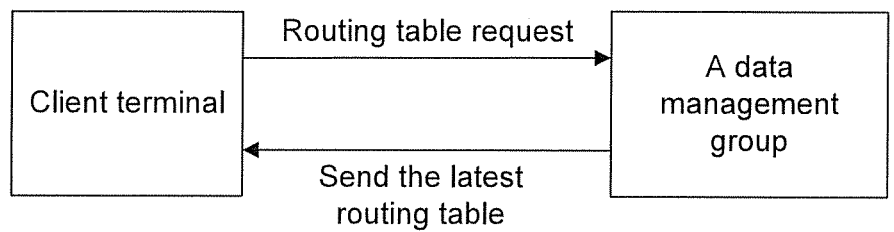
FIG. 4 is a schematic diagram illustrating an exemplary process of a requesting terminal sending a routing table request to a data management group according to some embodiments of the present disclosure.

FIG. 4 is a schematic diagram of an exemplary process 400 of a requesting terminal sending a routing table request to a data management group according to some embodiments of the present disclosure. The data management group can be any one of the data management groups in the distributed file system. In the following description, Pangu system of Alibaba is used as an example. A preset default first data management group can be a data management group of Taobao. A requesting terminal sends a routing table update request to one of the data management groups in the distributed file system. The data management group acquires routing table version information in the requesting terminal initiating the routing table request. The data management group can send a stored routing table to the requesting terminal when the acquired version information is inconsistent with routing table version information in the data management group. In some embodiments, routing table version information can be information used for representing a new routing table and an old routing table, to enable a data management group to recognize the latest routing table.

It is appreciated that the above-described data management group may be a data management group randomly selected by the distributed file system. In some embodiments, the data management group can be the first data management group in the distributed file system. The first data management group is the data management group that first receives the latest routing table in the distributed file system. Therefore, using the first data management group as the above data management group can help to ensure that the routing table received by the requesting terminal is also the latest routing table.

In some embodiments, before acquiring routing table version information in the requesting terminal from the routing table request, the method may further include the following procedures.

In step 205, a permission for a to-be-operated file or directory is determined according to information about the to-be-operated file or directory carried in the routing table request.

In step 207, if the permission allows operation, the step of acquiring routing table version information in the requesting terminal from the routing table request continues to be performed.

In step 209, if the permission does not allow operations, the acquisition of the latest routing table fails.

In some embodiments, the to-be-operated file or directory in the routing table can be a file name or file directory of a data management group initiating the routing table request.

As an example, in some embodiments, the distributed file system can be Pangu of Alibaba. The requesting terminal can send the routing table request to the first data management group in the distributed file system. The first data management group can determine, based on the file or directory information in the routing table, whether the requesting terminal has the permission to acquire the latest routing table.

With the above procedures, there can be a limit on the subjects that can acquire the routing table in the distributed file system. That way, only a requesting terminal that has the permission to acquire the latest routing table can acquire the latest routing table from the distributed file system.

In some embodiments, after the data management group receiving the routing table request acquires a version of the routing table in the requesting terminal, it may determine, through comparison, that the version of routing table in the requesting terminal is the version of the latest routing table. In that case, it can be considered that a requesting permission of the requesting terminal is tampered with. An error code can be returned to the requesting terminal. After receiving the error code, the requesting terminal can resend a request within a preset time. This process can be repeated until the version of the routing table in the requesting terminal is different from that of a routing table in the data management group receiving the routing table request.

Figure 5:
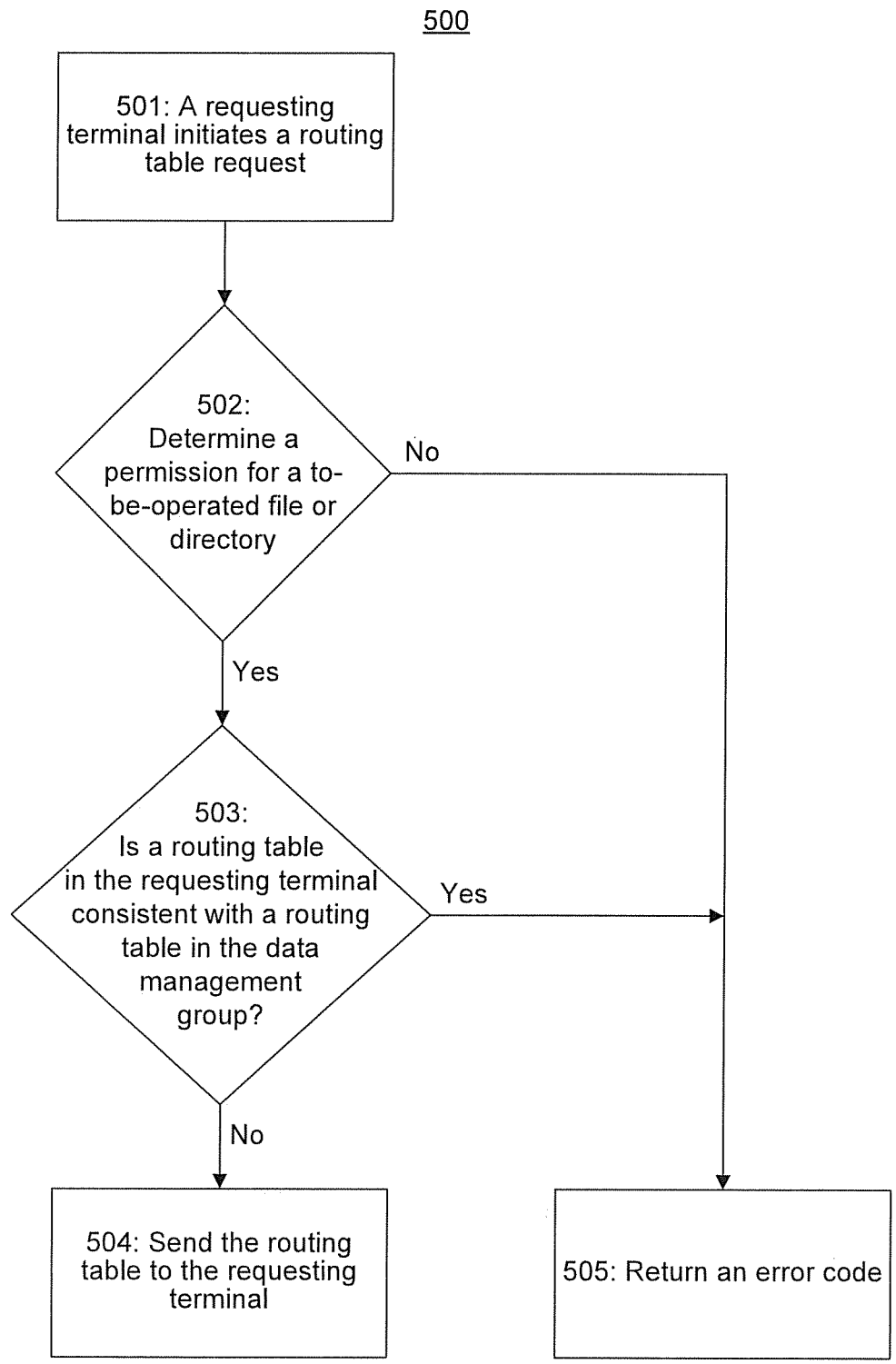
FIG. 5 is a flowchart of an exemplary process of sending a routing table request to a data management group according to some embodiments of the present disclosure.

FIG. 5 a flowchart of an exemplary process 500 of sending a routing table request to a data management group according to some embodiments of the present disclosure. As shown in FIG. 5, the exemplary process 500 can include the following procedures.

In step 501, a requesting terminal initiates a routing table request. In some embodiments, the request terminal can send the routing table request to any one of the data management groups in the distributed file system.

In step 502, a permission for a to-be-operated file or directory is determined. If it is determined that the to-be-operated file or directory has permission to operate, step 503 can be performed. If it is determined that the to-be-operated file or directory does not have permission to operate, step 505 can be performed.

In step 503, it can be determined whether a routing table in the requesting terminal is consistent with a routing table in the data management group. If it is determined that the routing table in the requesting terminal is not consistent with the routing table in the data management group, step 504 can be performed. If it is determined that the routing table in the requesting terminal is consistent with a routing table in the data management group, step 505 can be performed.

In step 504, the routing table is sent to the requesting terminal. If the routing table version information in the routing table request is inconsistent with routing table version information in the data management group, the data management group returns a locally stored routing table to the requesting terminal. Alternatively, the requesting terminal can acquire the latest routing table by accessing a data storage server deployed in the distributed file system.

In step 505, an error code is returned. If the requesting terminal does not acquire the latest routing table, the requesting terminal receives the error code returned by the data management group.

In some embodiments of the present disclosure, before the step of receiving, by a data management group in the distributed file system, a routing table request initiated by a requesting terminal, the method can further include the following procedures.

In step S011, after calling an access interface, the requesting terminal performs resolution to obtain access information of each data management group in the distributed file system.

In step S012, the requesting terminal sends a routing table request to a data management group. If the requesting terminal fails to acquire the latest routing table from the data management group, the requesting terminal sends the routing table request to another data management group in the distributed file system. The process can be repeated until the latest routing table is acquired.

In some embodiments, the access interface can be an API interface (Application Programming Interface). The access information of each data management group in the distributed file system can be master information of the data management group.

As an example, in some embodiments, the distributed file system can be Pangu of Alibaba. A user can call an API and performs resolution using, for example, an address resolver, to obtain address information (such as TCP/IP addresses) of the data management groups in the distributed file system. The address resolver is an address resolution tool developed by Alibaba, such as nuwa. After the address information of the data management groups is obtained by performing resolution, a request of acquiring a routing table can be sent randomly to any of the data management groups. The requesting process can be retried if the request fails to acquire the routing table.

It should be appreciated that, in some embodiments, if the request of the requesting terminal fails, it can be determined whether the current time is within a preset time range. If the current time is within the preset time range, a request of acquiring a routing table can be initiated again and sent to another data management group. If the current time is outside the preset time range, the requesting terminal can be stopped from continuing to send the request of acquiring a routing table.

In some embodiments of the present disclosure, before step S5011 of performing resolution to obtain access information of each data management group in the distributed file system, the method can further include the following procedures.

In step 5001, the requesting terminal performs resolution to obtain access information of a data storage server deployed in the distributed file system.

In step 5002, the requesting terminal sends a routing table request to the data storage server. If the requesting terminal fails to acquire the latest routing table from the data storage server or if a routing table stored in the data storage server is not the latest routing table, the requesting terminal can perform the step of performing resolution to obtain access information of each data management group in the distributed file system.

In some embodiments, the distributed file system may have a master-slave structure. The data storage server may be a chunk server. The requesting terminal may first send a routing table request to a chunk server. When the request sent to the chunk server fails or routing table version information in the chunk servers not the latest version, the requesting terminal can send the routing table request to a data management group in the distributed file system.

In some embodiments of the present disclosure, before receiving, by a data management group in the distributed file system, a routing table request initiated by a requesting terminal, the method can further include the following procedures.

In step 5011A, after calling an access interface, the requesting terminal performs resolution to obtain address information of a default first data management group in the distributed file system.

In step 5012A, the requesting terminal sends the routing table request to the first data management group. If the requesting terminal fails to acquire the latest routing table from the first data management group, the requesting terminal sends the routing table request at least one second data management group in the distributed file system. The requesting process can be repeated until the latest routing table is acquired.

As an example, in some embodiments, the distributed file system can be Pangu of Alibaba. A preset default first data management group can be a data management group of Taobao. A requesting terminal sends a routing table update request to the data management group of Taobao. After receiving the routing table request, the data management group of Taobao acquires routing table version information in the requesting terminal. The data management group of Taobao can send a stored routing table to the requesting terminal, if the version information is inconsistent with routing table version information in the data management group.

In some embodiments of the present disclosure, before performing resolution to obtain address information of the default first data management group in the distributed file system, the method can further include the following procedures.

In step 5001A, the requesting terminal performs resolution to obtain access information of a data storage server deployed in the distributed file system.

In step 5002A, the requesting terminal sends a routing table request to the data storage server. If the requesting terminal fails to acquire the latest routing table from the data storage server or if a routing table stored in the data storage server is not the latest routing table, the requesting terminal can perform the step of performing resolution to obtain access information of the first data management group in the distributed file system.

In some embodiments, the distributed file system may have a master-slave structure. The requesting terminal may first send a routing table request to a chunk server. When an error code is returned because the request sent to the chunk server fails and the routing table version information is incorrect, the requesting terminal can send the routing table request to any of the data management groups in the distributed file system.

Figure 6:
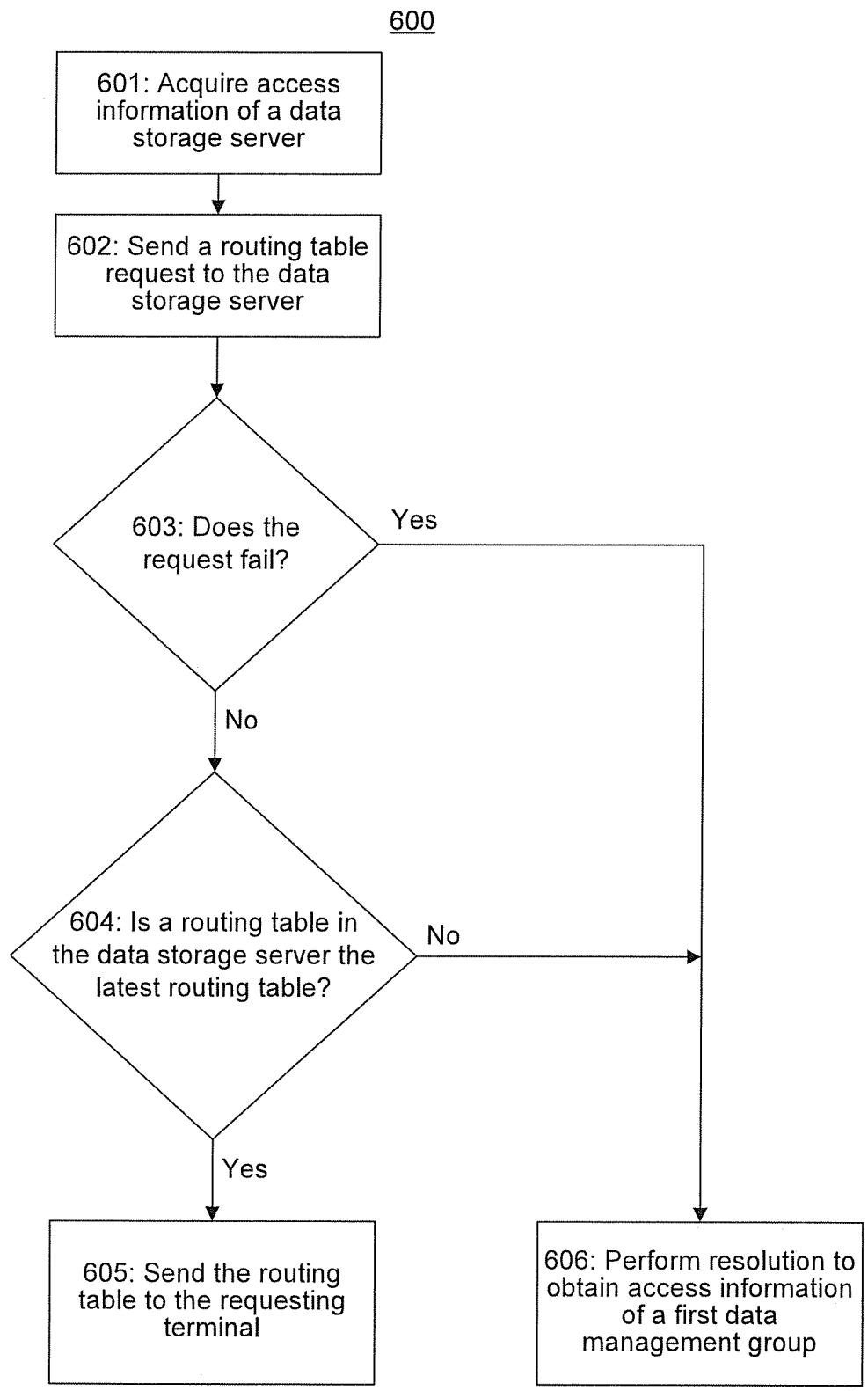
FIG. 6 is a flowchart illustrating an exemplary process of a requesting terminal sending a routing table request to a data storage server according to some embodiments of the present disclosure.

FIG. 6 is a flowchart illustrating an exemplary process 600 of a requesting terminal sending a routing table request to a data storage server according to some embodiments of the present disclosure. As shown in FIG. 6, the exemplary process 600 can include the following procedures:

In step 601, access information of a data storage server is acquired.

In step 602, a routing table request is sent to the data storage server.

In step 603, it is determined whether the request fails.

In step 604, it is determined whether a routing table in the data storage server is the latest routing table.

In step 605, the routing table is sent to the requesting terminal.

In step 606, the access information of a first data management group is obtained by performing resolution.

In some embodiments of the present disclosure, the method can further include: if it is detected that a routing table in the first data management group is modified in the process of the requesting terminal initiating the routing table request, accessing any of the data management groups in the distributed file system again to acquire the latest routing table.

During the process of the requesting terminal initiating the routing table request, it may be detected that the routing table in the first data management group is modified. If the requesting terminal continues to access the data management group in the distributed file system, the acquired routing table may not be the latest routing table. Therefore, in some embodiments of the present disclosure, when it is detected that the routing table in the first data management group is modified in the process of the requesting terminal initiating the routing table request, the process of accessing any of the data management groups in the distributed file system can be performed again. That way, the requesting terminal can acquire the latest routing table.

In some embodiments of the present disclosure, the method can further include: setting a read/write request threshold in the first data management group and the second data management groups deployed in the distributed file system. The read/write request threshold can be used to represent the maximum number of times of accessing a data management server in the corresponding data management group. If the number of times of accessing a data management server exceeds the read/write request threshold, access to the data management server can be terminated.

To further illustrate the above process, online production clusters AY75C and AY88B are taken as an example. For example, there are 5000 data management servers, the average number of times of read/write being 10,000, the peak number of times of read/write being 100,000. If there are 3 masters, a maximum number of times of read/write that each data management server bears is 33,000. This does not exceed the read/write request threshold set in the first data management group and the second data management groups.

In some embodiments of the present disclosure, the above method can further include: performing persistence processing on a data management server included in the first data management group; and sending a remote process call protocol used for modifying a routing table to at least one second data management group after the first data management group finishes performing the persistence processing, such that the second data management group can perform persistence processing. In some embodiments, performing persistence processing on a data management server can include storing terminal data of the data management server to a permanent storage device.

It is appreciated that updates of all routing tables in the distributed file system are dependent on updates of the first data management group. Therefore, the second data management group relies on the first data management group to a large extent. If the second data management group is down, repair of the second data management group depends on the first data management group. If the first data management group is also down, the second data management group may be repaired relying on the first data management group after the first data management group is repaired. As a result, the repair progress of the second data management group can be slow. In view of this, a remote call protocol can be sent to the second data management group to perform the persistence processing on the data server in the second data management group. When both the first data management group and the second data management group are down, the recovery of the second data management group does not have to rely on the first data management group, as the second data management group has performed the persistence processing on the routing table. That way, the efficiency of repairing a failure in the second data management group can be improved.

It should be appreciated that, for brevity, the foregoing method embodiments are described as a series of action combinations. A person skilled in the art should understand that the present disclosure is not limited to the described action order. Consistent with the present disclosure, some steps may be performed in a different order or may be performed simultaneously. Moreover, it is appreciated that the embodiments described herein are exemplary. The described actions and modules are not necessarily required in every embodiment of the present disclosure.

Based on the foregoing descriptions, those skilled in the art may clearly understand that the method embodiments described above may be implemented by software, software plus a necessary universal hardware platform, or hardware. Based on such understanding, some or part of the technical solutions of the present disclosure may be implemented in the form of a software product. The computer software product may be stored in a storage medium, such as a Read-Only Memory (ROM)/Random Access Memory (RAM), a magnetic disk, or an optical disc. The storage medium may include several instructions for instructing a processor of a terminal device to perform the method embodiments of the present disclosure. The terminal device can be, for example, a mobile phone, a computer, a server, a network device, or the like.

Figure 7:
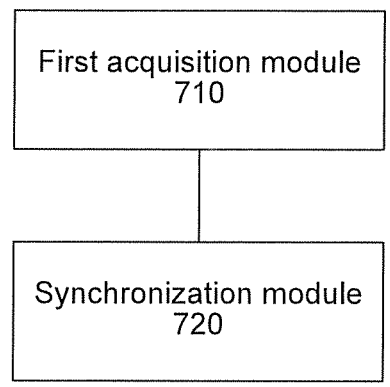
FIG. 7 is a schematic diagram of an exemplary routing table synchronization apparatus according to some embodiments of the present disclosure.

According to some embodiments of the present disclosure, routing table synchronization apparatuses are provided. FIG. 7 is a schematic diagram of an exemplary routing table synchronization apparatus 700 according to some embodiments of the present disclosure. As shown in FIG. 7, the exemplary apparatus 700 includes a first acquisition module 710 and a synchronization module 720.

The first acquisition module 710 can be configured to acquire modified routing table data if it is detected that a routing table in a default first data management group is modified. The synchronization module 720 is configured to synchronize the modified routing table data to at least one non-default second data management group to update a routing table in the at least one non-default second data management group. The first data management group and the at least one second data management group are deployed in a distributed file system.

In some embodiments, the default first data management group may be a data management group storing the most important data in the distributed file system, or a data management group having the largest data storage amount. In actual applications, which data management group in the distributed file system is used as the default first data management group may vary and is not limited by the present disclosure.

It is appreciated that the default first data management group can be used in the routing table synchronization process to detect a change in a routing table in the distributed file system. That is, the default first data management group can be used to detect whether a routing table in the distributed file system is modified, and acquire the latest modified routing table when it is detected that the routing table is modified.

It should be appreciated that, in the distributed file system, a federation can be used to distribute namespaces of data, to form a federation and further implement a storage mode in the distributed system. After the namespaces are divided into groups through federation in the distributed file system, a plurality of master groups are formed. Each group is a data management group. Among the plurality of data management groups in the distributed file system, one of the data management groups can be set as a default first data management group.

It should be appreciated the distributed file system may have a master/chunk server structure. A master can be configured to store meta (tag) information in the distributed file system. The meta information is attribute information of data. For example, it can include an index of data, a title of webpage data, a keyword, and other information. A chunk server provides a data storage service. In the foregoing routing table synchronization process, the routing table can be stored in the master of the distributed file system. The data management groups described above correspond to a plurality of data management groups obtained after the master is divided into groups.

In some embodiments, for example, the distributed file system can be Pangu of Alibaba. Pangu is a distributed file system that provides data storage services for Alibaba's cloud computing platform. Pangu includes a plurality of data management groups. For example, these can include data management groups of Taobao, Taodiandian, and Laiwang. One of the plurality of data management groups can be used by default as PanguDefaultVolume. That is, it can be used as the above-described default first data management group. The remaining data management groups in the distributed file system are second data management groups. For example, the data management group of Taobao can be used as the first data management group by default. The remaining data management groups, such as the data management groups of Taodiandian and Laiwang in the distributed file system are second data management groups. When a routing table is modified, the data management group of Taobao (e.g., the default first data management group) first receives the latest routing table. After acquiring the latest routing table, the first data management group synchronizes the latest routing table to the second data management groups. That is, modification of routing tables in the remaining data management groups (the second data management groups) can be accomplished by using the default first data management group.

In some embodiments, after the routing tables in the plurality of data management groups in the distributed file system are updated, an interface of a client terminal (a user terminal) can check and confirm a routing table in each data management group in the distributed file system, to ensure that the routing table in each data management group is the latest routing table.

The solutions of the embodiments provided in the present disclosure can address the technical problem in the existing technology that when a table in one data management group is modified, tables in the remaining data management groups cannot be modified synchronously because tables in the distributed file system are static tables.

Figure 8:
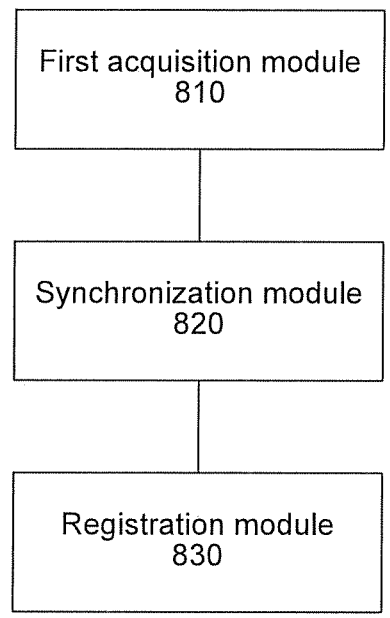
FIG. 8 is a schematic diagram of an exemplary routing table synchronization apparatus according to some embodiments of the present disclosure.

In some embodiments of the present disclosure, the apparatus can further include a registration module, as shown in the exemplary apparatus 800 of FIG. 8. The exemplary apparatus 800 includes a first acquisition module 810, a synchronization module 820, and a registration module 830. The first acquisition module 810 and synchronization module 820 can be configured to perform processing similar to that described above with reference to FIG. 7, the details of which are not repeated herein.

The registration module 830 can be configured to, when a new second data management group is deployed in the distributed file system, register a data management server in the new second data management group with the first data management group. The registration module 830 can be further configured to synchronize the routing table in the first data management group to the new second data management group.

In some embodiments, the new second data management group can be a data management group that does not exist in the original distributed file system. After the new second data management group is added, the data management server in the second data management group can be first registered with the default first data management group. That way, the latest routing table in the first data management group can be synchronized to the new second data management group. In some embodiments, the data management server can be a master of the second data management group.

As an example, in some embodiments, the distributed file system can be Pangu of Alibaba. A preset default first data management group can be a data management group of Taobao. If a data management group of Laiwang that does not exist in the original distributed file system is to be added to the Pangu distributed file system, a data management server of the data management group of Laiwang can be first registered with the data management group of Taobao. The data management server can be a master of the data management group of Laiwang. After the data management server of Laiwang is registered with the data management group of Taobao, communication between the data management group of Laiwang and the data management group of Taobao is enabled. The data management group of Laiwang becomes a second data management group similar to the remaining second data management groups in the distributed file system. That way, routing table synchronization can be performed for the data management group of Laiwang, so that the data management group of Laiwang includes the latest routing table.

The technical solutions provided in the above-described embodiments, can address the technical problem that it is difficult to synchronize a routing table after a new data management group is added to the distributed file system.

Figure 9:
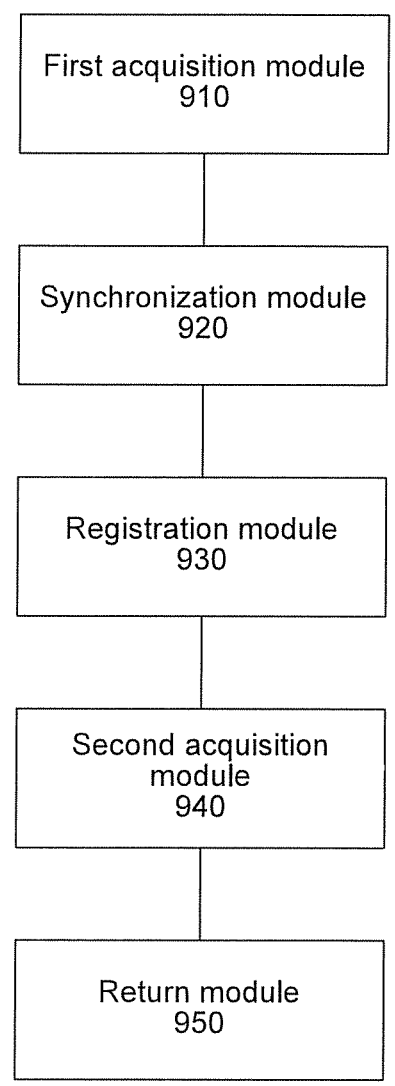
FIG. 9 is a schematic diagram of an exemplary routing table synchronization apparatus according to some embodiments of the present disclosure.

FIG. 9 is a schematic diagram of an exemplary routing table synchronization apparatus 900 according to some embodiments of the present disclosure. The exemplary apparatus 900 includes a first acquisition module 910, a synchronization module 920, a registration module 930, a second acquisition module 940, and a return module 950. The first acquisition module 910, synchronization module 920, and registration module 930 can be configured to perform processing similar to that described above with reference to FIG. 7 and FIG. 8, the details of which are not repeated herein.

The second acquisition module 940 can be configured to, after a data management group in the distributed file system receives a routing table request initiated by a requesting terminal, acquire routing table version information in the requesting terminal from the routing table request. The return module 950 can be configured to, if the routing table version information is inconsistent with routing table version information in the data management group, return, by the data management group, a locally stored routing table to the requesting terminal. Alternatively, the requesting terminal can acquire the latest routing table by accessing a data storage server deployed in the distributed file system.

With reference to FIG. 4, in some embodiments, the distributed file system can be Pangu of Alibaba. A preset default first data management group can be a data management group of Taobao. A requesting terminal sends a routing table update request to a data management group in the distributed file system. The data management group can acquire routing table version information in the requesting terminal initiating the routing table request. If the version information is inconsistent with routing table version information in the data management group, the data management group can send a stored routing table to the requesting terminal. In some embodiments, routing table version information can be information used for representing a new routing table and an old routing table, which enables a data management group to recognize the latest routing table.

It should be appreciated that the above data management group can be a data management group randomly selected by the distributed file system. In some embodiments, the data management group can be the first data management group in the distributed file system. The first data management group is the data management group that first receives the latest routing table in the distributed file system. To ensure that the routing table received by the requesting terminal is also the latest routing table in the distributed file system, the above data management group can be the first data management group in the distributed system.

Figure 10:
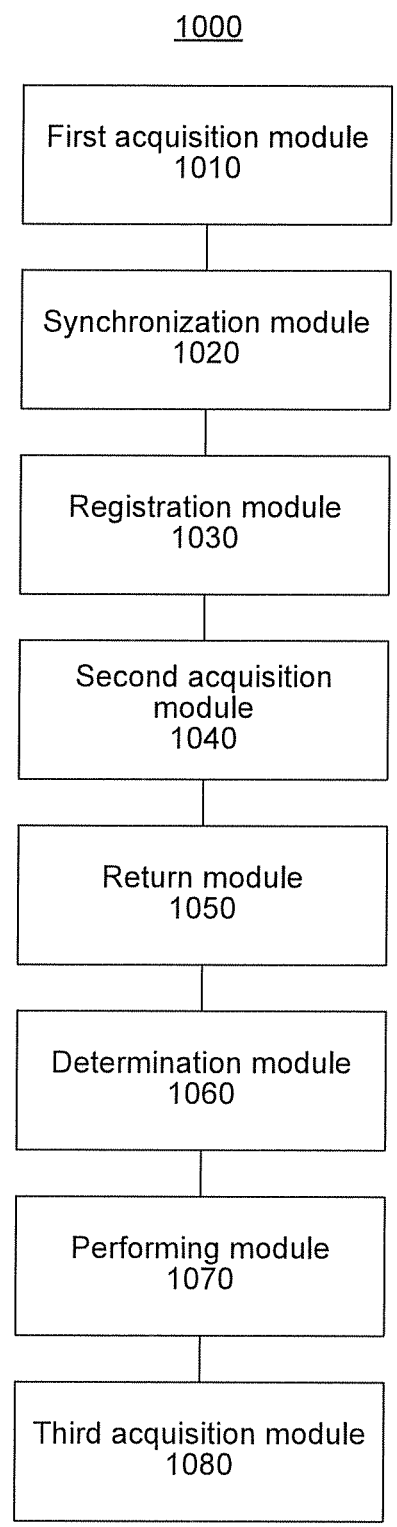
FIG. 10 is a schematic diagram of an exemplary routing table synchronization apparatus according to some embodiments of the present disclosure.

FIG. 10 is a schematic diagram of an exemplary routing table synchronization apparatus 1000 according to some embodiments of the present disclosure. As shown in FIG. 10, the exemplary apparatus 1000 includes a first acquisition module 1010, a synchronization module 1020, a registration module 1030, a second acquisition module 1040, a return module 1050, a determination module 1060, a performing module 1070, and a third acquisition module 1080. The first acquisition module 1010, synchronization module 1020, registration module 1030, second acquisition module 1040, and return module 1050 can be configured to perform processing similar to that described above with reference to FIGS. 7-10, the details of which are not repeated herein.

The determination module 1060 can be configured to determine a permission for a to-be-operated file or directory according to information about the to-be-operated file or directory carried in the routing table request. The performing module 1070 can be configured to, if the permission allows operations, continue to perform the step of acquiring routing table version information in the requesting terminal from the routing table request. The third acquisition module 1080 can be configured to, if the permission does not allow operations, fail to acquire the latest routing table.

In some embodiments of the present disclosure, a read/write request threshold can be set in the first data management group and the second data management groups deployed in the distributed file system. The read/write request threshold can be used to represent the maximum number of times of accessing a data management server in the corresponding data management group. If the number of times of accessing a data management server exceeds the read/write request threshold, access to a data management server can be terminated.

In some embodiments of the present disclosure, the apparatus 1000 can further include a persistence processing module. The persistence processing module can be configured to perform persistence processing on a data management server included in the first data management group. The persistence module can be further configured to send a remote process call protocol used for modifying a routing table to at least one second data management group, after the first data management group finishes the persistence processing. That way, the second data management group can perform persistence processing.

In some embodiments of the present disclosure, the apparatus 1000 can further include a resolution module and a third sending module. The resolution module can be configured to, after the requesting terminal calls the access interface, perform resolution to obtain address information of the default first data management group in the distributed file system. The third sending module can be configured to, when the requesting terminal sends the routing table request to the first data management group, if the requesting terminal fails to acquire the latest routing table from the first data management group, send the routing table request to one or more second data management groups in the distributed file system. The requesting process can be repeated until the latest routing table is acquired.

In some embodiments of the present disclosure, the apparatus 1000 can further include a second processing module and a fourth sending module. The second processing module can be configured to perform resolution to obtain access information of the data storage server deployed in the distributed file system, after the requesting terminal calls an access interface. The fourth sending module can be configured to, when the requesting terminal sends the routing table request to the data storage server, if the requesting terminal fails to acquire the latest routing table from the data storage server or if a routing table stored in the data storage server is not the latest routing table, perform the step of performing resolution to obtain access information of the first data management group in the distributed file system.

In some embodiments of the present disclosure, the apparatus 1000 can further include an accessing module. The access module can be configured to, if it is detected that a routing table in the first data management group is modified during the process of the requesting terminal initiating the routing table request, access a data management group in the distributed file system again to acquire the latest routing table.

In some embodiments of the present disclosure, a read/write request threshold can be set in the first data management group and the second data management groups deployed in the distributed file system. The read/write request threshold can be used to represent the maximum number of times of accessing a data management server in the corresponding data management group. If the number of times of accessing a data management server exceeds the read/write request threshold, access to a data management server can be terminated.

In some embodiments of the present disclosure, the apparatus 1000 can further include a persistence module. The persistence module can be configured to perform persistence processing on a data management server included in the first data management group. The persistent module can be further configured to send a remote process call protocol used for modifying a routing table to at least one second data management group after the first data management group finishes performing the persistence processing. That way, the second data management group can perform persistence processing.

Figure 11:
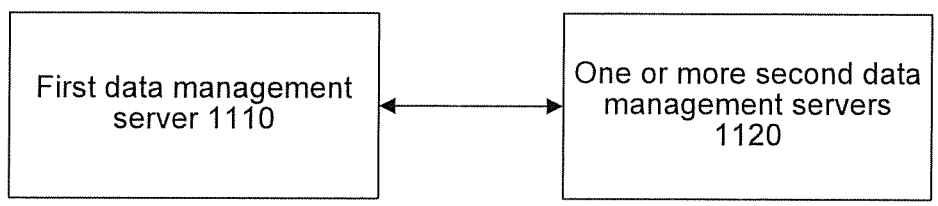
FIG. 11 is a schematic structural diagram of an exemplary routing table synchronization system according to some embodiments of the present disclosure.

According to some embodiments of the present disclosure, routing table synchronization systems are further provided. FIG. 11 is a schematic structural diagram of an exemplary routing table synchronization system 1100 according to some embodiments of the present disclosure. As shown in FIG. 11, the exemplary system 1100 includes a first data management server 1110 and at least one second data management server 1120.

The first data management server 1110 can be configured to acquire modified routing table data if it is detected that a locally stored routing table is modified. The first data management server 1110 can be further configured to perform synchronization based on the modified routing table data. The first data management server can be any server included in a default first data management group in a distributed file system.

The at least one second data management server 1120 has a communication relationship with the first data management server. The second data management server 1120 can be configured to receive the modified routing table data synchronized by the first data management server, to update a routing table in a second data management group. The second data management server can be any server included in a non-default second data management group in the distributed file system.

In some embodiments, the default first data management group may be any data management group in the distributed file system. The first data management group can be used to synchronize a received latest routing table to another data management group deployed in the distributed file system.

It is appreciated that in some embodiments, the distributed file system can be a Pangu distributed file system developed by Alibaba. A federation mode may be introduced to form data management groups. That is, a mode of dividing namespaces of data in a distributed manner adopted in federation can be applied to form data management groups. That way, a group set including one or more data management servers is formed, thus implementing a storage mode in the distributed system. After the namespaces are divided into groups by using federation in the distributed file system, a plurality of master groups can be formed. Each group is a data management group. Among the plurality of data management groups in the distributed file system, one of the data management groups can be a default first data management group.

It is appreciated that the distributed file system may have a master/chunk server structure. A data management server master is configured to store meta (tag) information in the distributed file system. The meta information is attribute information of data. It can include, for example, an index of data, a title of webpage data, a keyword, and other information. A chunk server provides a data storage service. The routing table can be stored in the master of the distributed file system. The data management groups correspond to a plurality of data management groups obtained after the master is divided into groups.

As an example, in some embodiments, the distributed file system can be Pangu of Alibaba. Pangu is a distributed file system that provides data storage services for Alibaba's cloud computing platform. Pangu includes a plurality of data management groups, such as data management groups of Taobao, Taodiandian, and Laiwang. One of the plurality of data management groups is used by default as PanguDefaultVolume, which corresponds to the default first data management group described above. The remaining data management groups in the distributed file system are second data management groups. For example, a data management group of Taobao can be used as the first data management group by default. The remaining data management groups, such as the data management groups of Taodiandian and Laiwang in the distributed file system are second data management groups. When the data management group of Taobao (the default first data management group) detects that a locally stored routing table is modified, the data management group of Taobao receives the latest routing table. The data management group of Taobao can synchronize the received latest routing table to the second data management groups. The second data management groups can receive the modified routing table synchronized by the data management group of Taobao. That way, a routing table stored locally in the one or more second data management groups can be updated to the modified routing table. That is, modification of routing tables in the remaining data management groups (the second data management groups) can be accomplished by using the default first data management group.

After the routing tables in the plurality of data management groups in the distributed file system are updated, an interface of a client terminal (a user terminal) can confirm a routing table in each data management group in the distributed file system, to ensure that the routing table in each data management group is the latest routing table.

With reference to FIG. 3, when a routing table changes due to factors such as modification by a user, the first data management group in the distributed file system first receives a modified routing table. The first data management group can then synchronize the modified routing table to the remaining second data management groups in the distributed file system. The number of the second data management groups in actual applications is not limited by the present disclosure. That is, when the distributed file system has a plurality of second data management groups, the new routing table can be synchronized to all the second data management groups by using the first data management group.

In light of the above, the solutions of the embodiments provided in the present disclosure can address the technical problem in the existing technology that when a table in any data management group is modified, tables in the remaining data management groups cannot be modified synchronously because tables in the distributed file system are static tables.

In some embodiments of the present disclosure, the system may further include a requesting terminal. The requesting terminal can communicate with the first data management server and the one or more second data management servers. The requesting terminal can be configured to send a routing table request to a data management group in the distributed file system and to receive a routing table returned by the data management group. Alternatively, the requesting terminal can acquire the latest routing table by accessing a data storage server deployed in the distributed file system.

In some embodiments, when the requesting terminal sends the routing table request to the a data management group in the distributed file system, the data management group receiving the routing table request may acquire routing table version information in the routing table request. When the routing table version information in the routing table request is inconsistent with routing table version information in the data management group receiving the routing table request, the data management group can feed back a locally stored routing table to the requesting terminal.

In some embodiments, the distributed file system can be Pangu of Alibaba. A preset default first data management group can be a data management group of Taobao. A requesting terminal can send a routing table update request to any of the data management groups in the distributed file system. The data management group can acquire routing table version information in the requesting terminal initiating the routing table request. The data management group can further send a stored routing table to the requesting terminal, when the version information is inconsistent with routing table version information in the data management group. The routing table version information can be information used for representing a new routing table and an old routing table, to enable a data management group to recognize the latest routing table.

It is appreciated that the data management group receiving the request may be a data management group randomly selected by the distributed file system. In some embodiments, it can be the first data management group. The first data management group is the data management group that first receives the latest routing table in the distributed file system. Therefore, to ensure that the routing table received by the requesting terminal is also the latest routing table in the distributed file system, the data management group can be the first data management group in the distributed system.

In some embodiments of the present disclosure, the requesting terminal can be further configured to, after calling an access interface, perform resolution to obtain access information of each data management group in the distributed file system. The requesting terminal can then send a routing table request to one of the data management groups. If the requesting terminal fails to acquire the latest routing table from the data management group, the requesting terminal can send the routing table request to another data management group in the distributed file system. The process can be repeated until the latest routing table is acquired.

In some embodiments, the access interface may be an API interface. The access information of each data management group in the distributed file system can be master information of the data management group.

In some embodiments of the present disclosure, the requesting terminal can be further configured to, before performing resolution to obtain access information of each data management group, perform resolution to obtain access information of a data storage server deployed in the distributed file system. The requesting terminal can send the routing table request to the data storage server. If the requesting terminal fails to acquire the latest routing table from the data storage server or a routing table stored in the data storage server is not the latest routing table, the requesting terminal starts to perform resolution to obtain access information of each data management group in the distributed file system.

In some embodiments, the distributed file system may have a master-slave structure. The any one of the data management groups may be a master. The data storage server may be a chunk server. The requesting terminal may first send a routing table request to a chunk server. When the request sent to the chunk server fails or routing table version information in the chunk server is not the latest version, the requesting terminal can send the routing table request to a data management group in the distributed file system.

In some embodiments of the present disclosure, the requesting terminal can be further configured to, after calling an access interface, perform resolution to obtain address information of the default first data management group in the distributed file system, and send the routing table request to the first data management group. If the requesting terminal fails to acquire the latest routing table from the first data management group, the requesting terminal can send the routing table request to one or more second data management groups in the distributed file system. The requesting process can be repeated until the latest routing table is acquired.

As an example, in some embodiments, the distributed file system can be Pangu of Alibaba. A user can call an API and perform resolution, by using an address resolver of Alibaba, to obtain address information of all the data management groups in the distributed file system. The address resolver refers to an address resolution tool, such as nuwa. The address information can be, for example, TCP/IP addresses. After the address information of all the data management groups is obtained by performing resolution, a request of acquiring a routing table can be sent randomly to any data management group. If the request fails, the above process can be repeatedly retried, until the latest routing table is acquired successfully.

It is appreciated that, if the request of the requesting terminal fails, it may need to be determined whether the current time is within a preset time range. If the current time is within the preset time range, a request of acquiring a routing table can be initiated again for sending to another data management group. If the current time is outside the preset time range, the requesting terminal can be stopped from continuing to send the request of acquiring a routing table.

In some embodiments of the present disclosure, the requesting terminal can be further configured to, before obtaining access information of the default first data management group in the distributed file system, perform resolution to obtain access information of a data storage server deployed in the distributed file system. The requesting terminal can send the routing table request to the data storage server. If the requesting terminal fails to acquire the latest routing table from the data storage server or if a routing table stored in the data storage server is not the latest routing table, the requesting terminal can perform resolution to obtain access information of the first data management group in the distributed file system.

In some embodiments, the distributed file system may have a master-slave structure. The default first data management group can be a master in the default first data management group. The data storage server may be a chunk server. When the request sent to the chunk server fails or routing table version information in the chunk server is not the latest version, the requesting terminal can send the routing table request to the master.

In some embodiments of the present disclosure, the requesting terminal can be further configured to, if it is detected that a routing table in the first data management group is modified in the process of initiating the routing table request, access any one of the data management groups in the distributed file system again to acquire the latest routing table.

It may be detected that the routing table in the first data management group is modified in the process of the requesting terminal initiating the routing table request. In that case, if the requesting terminal continues to access the data management group in the distributed file system, the acquired routing table may not be the latest routing table. Therefore, in some embodiments, when it is detected that the routing table in the first data management group is modified in the process of the requesting terminal initiating the routing table request, the process of accessing any of the data management groups in the distributed file system is performed again. That way, it can be ensured that the requesting terminal acquires the latest routing table.

According to some embodiments of the present disclosure, computer terminals are provided. The computer terminal can be, for example, any computer terminal device in a computer terminal group. In some embodiments, the computer terminal may also be a terminal device such as a mobile terminal. Further, in some embodiments, the computer terminal may be located in at least one of a plurality of network devices in a computer network.

In some embodiments, the computer terminal may perform program codes corresponding to a routing table synchronization method. For example, the routing table synchronization method can comprise the following procedures: acquiring modified routing table data if it is detected that a routing table in a default first data management group is modified; and synchronizing the modified routing table data to at least one non-default second data management groups to update a routing table in the non-default second data management group. The first data management group and at least one second data management group are deployed in a distributed file system.

Figure 12:
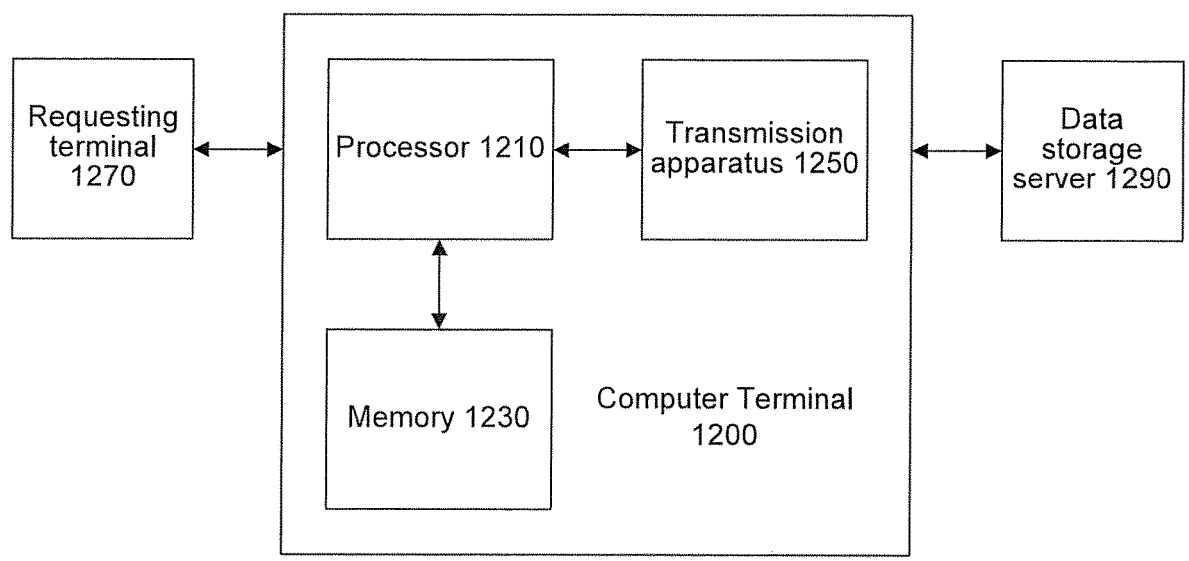
FIG. 12 is a structural block diagram of an exemplary computer terminal according to some embodiments of the present disclosure.

FIG. 12 is a structural block diagram of an exemplary computer terminal 1200 according to some embodiments of the present disclosure. As shown in FIG. 12, the exemplary computer terminal 1200 may include one or more processors 1210 (only one is shown in the figure), a memory 1230, a transmission apparatus 1250, a requesting terminal 1270, and a data storage server 1290.

Memory 1230 can be configured to store a software program or a module, such as program instructions/modules corresponding to a routing table synchronization method or apparatus provided in the embodiments of the present disclosure. Processor 1210 can execute the software program and module stored in memory 1230 to perform various functional applications and data processing, for example, to implement a routing table synchronization method. Memory 1230 may include, for example, a high-speed random access memory, or anon-volatile memory, such as one or more magnetic storage apparatuses, a flash memory, or another non-volatile solid-state memory. In some embodiments, memory 1230 may further include memories remotely disposed with respect to the processor. The remote memories can be connected to terminal 1200 through a network. Examples of the network include, but are not limited to, the Internet, an Intranet, a local area network, a mobile telecommunications network, and their combinations.

Processor 1210 may call, by using the transmission apparatus, information and an application program stored in memory 1230, so as to perform, for example, the following steps in a routing table synchronization method: acquiring modified routing table data if it is detected that a routing table in a default first data management group is modified; and synchronizing the modified routing table data to at least one non-default second data management group, to update a routing table in the at least one non-default second data management group. The first data management group and at least one second data management group are deployed in a distributed file system.

In some embodiments, processor 1210 can further execute program codes to perform: when a new second data management group is deployed in the distributed file system, registering a data management server in the new second data management group with the first data management group, and synchronizing the routing table in the first data management group to the new second data management group.

In some embodiments, processor 1210 can further execute program codes to perform: after a in the distributed file system receives a routing table request initiated by a requesting terminal (requesting terminal 1270), acquiring routing table version information in the requesting terminal from the routing table request; if the routing table version information is inconsistent with routing table version information in the data management group, returning, by the data management group, a locally stored routing table to the requesting terminal; or acquiring, by the requesting terminal, the latest routing table by accessing a data storage server deployed in the distributed file system.

In some embodiments, processor 1210 can further execute program codes to perform: determining a permission for a to-be-operated file or directory according to information about the to-be-operated file or directory carried in the routing table request; if the permission allows operations, continuing to perform the step of acquiring routing table version information in the requesting terminal from the routing table request; and if the permission does not allow operations, failing to acquire the latest routing table.

In some embodiments, processor 1210 can further execute program codes to perform: after the requesting terminal calls an access interface, performing resolution to obtain access information of each data management group in the distributed file system; sending, by the requesting terminal, a routing table request to any of the data management groups; and if the requesting terminal fails to acquire the latest routing table from the data management group, sending the routing table request to another data management group in the distributed file system. The requesting process can be repeated until the latest routing table is acquired.

In some embodiments, processor 1210 can further execute program codes to perform: performing, by the requesting terminal, resolution to obtain access information of a data storage server deployed in the distributed file system; sending, by the requesting terminal, the routing table request to the data storage server. If the requesting terminal fails to acquire the latest routing table from the data storage server or a routing table stored in the data storage server is not the latest routing table, the requesting terminal can perform the step of performing resolution to obtain access information of each data management group in the distributed file system.

In some embodiments, before any of the data management groups in the distributed file system receives the routing table request initiated by the requesting terminal, processor 1210 can further execute program codes to perform: after the requesting terminal calls an access interface, performing resolution to obtain address information of the default first data management group in the distributed file system; and sending, by the requesting terminal, the routing table request to the first data management group. If the requesting terminal fails to acquire the latest routing table from the first data management group, the requesting terminal can send a routing table request to one or more second data management groups in the distributed file system, till the latest routing table is acquired.

In some embodiments, before the step of performing resolution to obtain address information of the default first data management group in the distributed file system, processor 1210 can further execute program codes to perform: performing, by the requesting terminal, resolution to obtain access information of a data storage server deployed in the distributed file system; and sending, by the requesting terminal, the routing table request to the data storage server. If the requesting terminal fails to acquire the latest routing table from the data storage server or a routing table stored in the data storage servers not the latest routing table, the requesting terminal can perform resolution to obtain access information of the first data management group in the distributed file system.

In some embodiments, processor 1210 can further execute program codes to perform: if it is detected that a routing table in the first data management group is modified in the process of the requesting terminal initiating the routing table request, accessing any of the data management groups in the distributed file system again to acquire the latest routing table.

In some embodiments, processor 1210 can further execute program codes to perform: setting a read/write request threshold in the first data management group and at least one second data management group deployed in the distributed file system. The read/write request threshold can be used to represent the maximum number of times of accessing a data management server in the corresponding data management group. If the number of times of accessing a data management server exceeds the read/write request threshold, access to a data management server can be terminated.

In some embodiments, processor 1210 can further execute program codes to perform: performing persistence processing on a data management server included in the first data management group, and sending a remote process call protocol used for modifying a routing table to at least one second data management group after the first data management group finishes performing the persistence processing. That way, the second data management group can perform persistence processing.

In view of the above, the solutions of the embodiments provided in the present disclosure can address the technical problem in the existing technology that when a table in any data management group is modified, tables in the remaining data management groups cannot be modified synchronously because tables in a distributed file system are static tables.

It is appreciated that the structure shown in FIG. 12 is merely schematic and exemplary. In some embodiment, computer terminal 1200 may also be a terminal device such as a smart phone (e.g., an Android phone, an iOS phone, and the like), a tablet computer, a palmtop computer, a Mobile Internet Device (MID), and a PAD. FIG. 12 is not intended to limit the structure of the above electronic apparatus. For example, computer terminal 1200 may include more or fewer components (such as a network interface and a display apparatus) than those shown in FIG. 12. Further, it can have a configuration different from that shown in FIG. 12.

Those of ordinary skill in the art may understand that all or a part of steps in various methods of the above embodiment can be implemented by a program instructing hardware related to a terminal device. The program may be stored in a computer readable storage medium, and the storage medium may include: a flash memory, a ROM, a RAM, a magnetic disk, or an optical disc.

According to some embodiments of the present disclosure, storage mediums are further provided. The storage medium may be configured to store program codes which can be executed by a process or to implement routing table synchronization methods provided in the present disclosure. In some embodiments, the storage medium may be located in any computer terminal in a computer terminal group in a computer network or located in any mobile terminal in a mobile terminal group. For example, the storage medium can be configured to store program codes for performing the following steps: acquiring modified routing table data if it is detected that a routing table in a default first data management group is modified; and synchronizing the modified routing table data to at least one non-default second data management groups to update a routing table in the at least one non-default second data management group. The first data management group and at least one second data management group are deployed in a distributed file system.

In some embodiments, the storage medium can be configured to store program codes for performing: when a new second data management group is deployed in the distributed file system, registering a data management server in the new second data management group with the first data management group, and synchronizing the routing table in the first data management group to the new second data management group.

In some embodiments, the storage medium can be configured to store program codes for performing: after a data management group in the distributed file system receives the routing table request initiated by the requesting terminal, acquiring routing table version information in the requesting terminal from the routing table; if the routing table version information is inconsistent with routing table version information in the data management group, returning a locally stored routing table to the requesting terminal by the data management group, or acquiring, by the requesting terminal, the latest routing table by accessing a data storage server deployed in the distributed file system.

In some embodiments, the storage medium can be configured to store program codes for performing: determining a permission for a to-be-operated file or directory according to information about the to-be-operated file or directory carried in the routing table request; if the permission allows operations, continuing to perform the step of acquiring routing table version information in the requesting terminal from the routing table; and if the permission does not allow operations, failing to acquire the latest routing table.

In some embodiments, the storage medium can be configured to store program codes for performing: after the requesting terminal calls an access interface, performing resolution to obtain access information of each data management group in the distributed file system; and sending a routing table request to any data management group by the requesting terminal. If the requesting terminal fails to acquire the latest routing table from the data management group, the requesting terminal can send the routing table request to another data management group in the distributed file system. The process can be repeated until the latest routing table is acquired.

In some embodiments, the storage medium can be configured to store program codes for performing: performing, by the requesting terminal, resolution to obtain access information of a data storage server deployed in the distributed file system; and sending, by the requesting terminal, the routing table request to the data storage server. If the requesting terminal fails to acquire the latest routing table from the data storage server or a routing table stored in the data storage server is not the latest routing table, the requesting terminal can perform the step of performing resolution to obtain access information of each data management group in the distributed file system.

In some embodiments, the storage medium can be configured to store program codes for performing: after the requesting terminal calls the access interface, performing resolution to obtain address information of the default first data management group in the distributed file system; and sending, by the requesting terminal, the routing table request to the first data management group. If the requesting terminal fails to acquire the latest routing table from the first data management group, the requesting terminal can send a routing table request to any of the one or more second data management groups in the distributed file system. The process can be repeated until the latest routing table is acquired.

In some embodiments, the storage medium can be configured to store program codes for performing: performing, by the requesting terminal, resolution to obtain access information of a data storage server deployed in the distributed file system; and sending, by the requesting terminal, the routing table request to the data storage server. If the requesting terminal fails to acquire the latest routing table from the data storage server or a routing table stored in the data storage server is not the latest routing table, the requesting terminal can perform the step of performing resolution to obtain access information of the default first management group in the distributed file system.

In some embodiments, the storage medium can be configured to store program codes for performing: if it is detected that a routing table in the first data management group is modified in the process of the requesting terminal initiating the routing table, accessing any of the data management groups in the distributed file system again to acquire the latest routing table.

In some embodiments, the storage medium can be configured to store program codes for performing: setting a read/write request threshold in the first data management group and the at least one second data management group deployed in the distributed file system. The read/write request threshold can be used to represent the maximum number of times of accessing a data management server in the corresponding data management group. If the number of times of accessing a data management server exceeds the read/write request, access to a data management server can be terminated.

In some embodiments, the storage medium can be configured to store program codes for performing: performing persistence processing on a data management server included in the first data management group, and sending a remote process call protocol used for modifying a routing table to at least one second data management group after the first data management group finishes performing the persistence processing. That way, the second data management group can perform persistence processing.

The reference numbers used in the above description of the present disclosure are merely used for description. They do not represent a mandatory order or sequence. In the above-described embodiments of the present disclosure, some embodiments may be described with a focus on certain parts or aspects. For parts that are not described in detail in a particular embodiment, reference may be made to related descriptions in other embodiments.

In view of the several embodiments described above, it is appreciated that the technical solutions of the present disclosure may be implemented in other manners. For example, the apparatus embodiments described in the foregoing are merely schematic. The division of units or modules represent only division of logic functions. There may be other division manners in actual implementation. For example, a plurality of units or components may be combined or may be integrated into another system. Some features may be omitted or not performed in some embodiments. Further, the shown or discussed coupling or direct coupling or communication connection between the units or modules may be implemented by using some interfaces. Indirect coupling or communication connection between units or modules may be in an electrical form or other forms.

Units or modules described as separated parts may or may not be physically separated. Parts shown as units may or may not be physical units, and they may be located at the same place, or be distributed in a plurality of network units. Further, in actual implementation, the objective of the solutions of the present disclosure may be achieved by selectively combining some or all units described above.

In addition, various functional units in the embodiments of the present disclosure may be integrated into one processing unit. Each unit may also exist alone physically. Alternatively, two or more units may also be integrated into one unit. The integrated units may be implemented in the form of hardware and may also be implemented in the form of a software functional unit. The integrated units, if implemented in the form of a software functional unit and used as an independent product, may be stored in a computer readable storage medium. Based on such an understanding, all or part of the technical solutions of the present disclosure may be implemented in the form of a software product. The computer software product may be stored in a storage medium, which can include several instructions for instructing a computer device to perform all or a part of the processing in the methods described in the embodiments of the present disclosure. The computer device can include a personal computer, a server, a network device or the like.

The foregoing storage medium may include, for example, any medium that can store a program code, such as a USB flash disk, a removable hard disk, a Read-Only Memory (ROM), a Random Access Memory (RAM), a mobile hard disk, a magnetic disk, an optical disc, or other media that can store program codes. The storage medium can be a non-transitory computer readable medium. Common forms of non-transitory media include, for example, a floppy disk, a flexible disk, hard disk, solid state drive, cloud storage, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM any other memory chip or cartridge, and networked versions of the same.

It is appreciated that those described above are merely exemplary embodiments of the present disclosure. It is appreciated that, those of ordinary skill in the art may further obtain other variations and improvements without departing from the principles of the present disclosure. Such variations and improvements shall all fall within the protection scope of the present disclosure.

The invention claimed is:

1. A routing table synchronization method, comprising:
acquiring, by a first data management group, modified routing table data in response to a routing table in a distributed file system being modified;
synchronizing the modified routing table data to at least one second data management group to update a routing table in the at least one second data management group, the first data management group and the at least one second data management group being data management groups deployed in the distributed file system;

receiving, by one of the data management groups in the distributed file system, a routing table request initiated by a requesting terminal; and in response to a routing table in the first data management group being modified during the requesting process, providing access to a latest routing table to the requesting terminal submitting a new request, or in response to the one of the data management groups failing to provide a latest routing table, receiving, by another data management group, the routing table request, wherein address information of each of the data management groups is obtained by the requesting terminal through resolution.

2. The method according to claim 1, wherein when a new data management group is deployed in the distributed file system, a data management server in the new data management group is registered to the first data management group, and the method further comprises:

synchronizing the modified routing table data to the new data management group.

3. The method according to claim 1, wherein the routing table request includes routing table version information in the requesting terminal, the method further comprises:

in response to the routing table version information in the requesting terminal being inconsistent with routing table version information in the data management group receiving the request, returning, by the data management group receiving the request, a locally stored routing table to the requesting terminal, or providing access, by a data storage server deployed in the distributed file system, of the latest routing table to the requesting terminal.

4. The method according to claim 3, wherein after the one of the data management groups receives the routing table request from the requesting terminal, the method further comprises:

determining a permission for a to-be-operated file or directory based on the routing table request; and in response to the permission allowing operations, acquiring the routing table version information in the requesting terminal based on the routing table request.

5. The method according to claim 1, wherein before receiving, by the one of the data management groups, the routing table request from the requesting terminal, the method further comprises:

receiving, by a data storage server in the distributed file system, the routing table request; and in response to the data storage server failing to provide the latest routing table, receiving, by the one of the data management groups, the routing table request, wherein access information of the data storage server is obtained by the requesting terminal through resolution.

6. The method according to claim 1, wherein receiving, by one of the data management groups in the distributed file system, a routing table request initiated by a requesting terminal comprises:

receiving, by the first data management group, the routing table request from the requesting terminal.

7. The method according to claim 6, wherein before receiving, by the first data management group, the routing table request from the requesting terminal, the method further comprises:

receiving, by a data storage server in the distributed file system, the routing table request; and in response to the data storage server failing to provide the latest routing table, receiving, by the first data management group, the routing table request, wherein access information of the data storage server is obtained by the requesting terminal through resolution.

8. The method according to claim 1, wherein persistence processing is performed on a data management server in the first data management group, and a remote process call protocol used for modifying a routing table is sent to at least one second data management group.

9. A routing table synchronization method, comprising:

acquiring, by a first data management group, modified routing table data in response to a routing table in a distributed file system being modified; and synchronizing the modified routing table data to at least one second data management group to update a routing table in the at least one second data management group, the first data management group and the at least one second data management group being data management groups deployed in the distributed file system;

wherein a read/write request threshold is set in the first data management group and the at least one second data management group, the method further comprising:

in response to a number of times of accessing a data management server in a corresponding data management group exceeding the read/write request threshold, terminating access to the corresponding data management group.

10. The method according to claim 9, wherein when a new data management group is deployed in the distributed file system, a data management server in the new data management group is registered to the first data management group, and the method further comprises:

synchronizing the modified routing table data to the new data management group.

11. The method according to claim 9, wherein the routing table request includes routing table version information in the requesting terminal, the method further comprises:

in response to the routing table version information in the requesting terminal being inconsistent with routing table version information in the data management group receiving the request, returning, by the data management group receiving the request, a locally stored routing table to the requesting terminal, or providing access, by a data storage server deployed in the distributed file system, of the latest routing table to the requesting terminal.

12. The method according to claim 11, wherein after the one of the data management groups receives the routing table request from the requesting terminal, the method further comprises:

determining a permission for a to-be-operated file or directory based on the routing table request; and in response to the permission allowing operations, acquiring the routing table version information in the requesting terminal based on the routing table request.

13. The method according to claim 9, wherein persistence processing is performed on a data management server in the first data management group, and a remote process call protocol used for modifying a routing table is sent to at least one second data management group.

14. A routing table synchronization apparatus, comprising:
a memory storing a set of instructions; and
a processor configured to execute the set of instructions to cause the routing table synchronization apparatus to perform:
acquiring, by a first data management group, modified routing table data if a routing table in a distributed file system is modified;
synchronizing the modified routing table data to at least one second data management group to update a routing table in the at least one second data management group, the first data management group and the at least one second data management group being data management groups deployed in the distributed file system;
receiving, by one of the data management groups in the distributed file system, a routing table request initiated by a requesting terminal; and
if a routing table in the first data management group is modified during the requesting process, providing access to a latest routing table to the requesting terminal submitting a new request, or
if one of the data management groups fails to provide a latest routing table, receiving, by another data management group, the routing table request, wherein address information of each of the data management groups is obtained by the requesting terminal through resolution.

15. The apparatus according to claim 14, wherein when a new data management group is deployed in the distributed file system, a data management server in the new data management group is registered to the first data management group, and the method further comprises:
synchronizing the modified routing table data to the new data management group.

16. The apparatus according to claim 14, wherein the routing table request includes routing table version information in the requesting terminal, the processor is further configured to execute the set of instructions to cause the routing table synchronization apparatus to perform:
if the routing table version information in the requesting terminal is inconsistent with routing table version information in the data management group receiving the request, returning, by the data management group receiving the request, a locally stored routing table to the requesting terminal, or
providing access, by a data storage server deployed in the distributed file system, of the latest routing table to the requesting terminal.

17. The apparatus according to claim 16, wherein after the one of the data management groups receives the routing table request from the requesting terminal, the processor is further configured to execute the set of instructions to cause the routing table synchronization apparatus to perform:
determining a permission for a to-be-operated file or directory based on the routing table request; and
in response to the permission allowing operations, acquiring the routing table version information in the requesting terminal based on the routing table request.

18. The apparatus according to claim 14, wherein persistence processing is performed on a data management server in the first data management group, and a remote process call protocol used for modifying a routing table is sent to at least one second data management group.

19. A routing table synchronization apparatus, comprising:
a memory storing a set of instructions; and
a processor configured to execute the set of instructions to cause the routing table synchronization apparatus to perform:
acquiring, by a first data management group, modified routing table data if a routing table in a distributed file system is modified; and
synchronizing the modified routing table data to at least one second data management group to update a routing table in the at least one second data management group, the first data management group and the at least one second data management group being data management groups deployed in the distributed file system;
wherein a read/write request threshold is set in the first data management group and the at least one second data management group, the processor is further configured to execute the set of instructions to cause the routing table synchronization apparatus to perform:
if a number of times of accessing a data management server in a corresponding data management group exceeds the read/write request threshold, terminating access to the corresponding data management group.

20. A non-transitory computer readable medium that stores a set of instructions that is executable by at least one processor of a routing table synchronization apparatus to cause the apparatus to perform a routing table synchronization method, comprising:
acquiring, by a first data management group, modified routing table data if a routing table in a distributed file system is modified;
synchronizing the modified routing table data to at least one second data management group to update a routing table in the at least one second data management group, the first data management group and the at least one second data management group being data management groups deployed in the distributed file system;
receiving, by one of the data management groups in the distributed file system, a routing table request initiated by a requesting terminal; and
if a routing table in the first data management group is modified during the requesting process, providing access to a latest routing table to the requesting terminal submitting a new request, or
in response to the one of the data management groups failing to provide a latest routing table, receiving, by another data management group, the routing table request, wherein address information of each of the data management groups is obtained by the requesting terminal through resolution.

* * * * *